Feb. 12, 1929.
L. T. VELEN
1,702,141
SHOCK LOADER AND CONVEYER
Filed Aug. 6, 1925
3 Sheets-Sheet 2
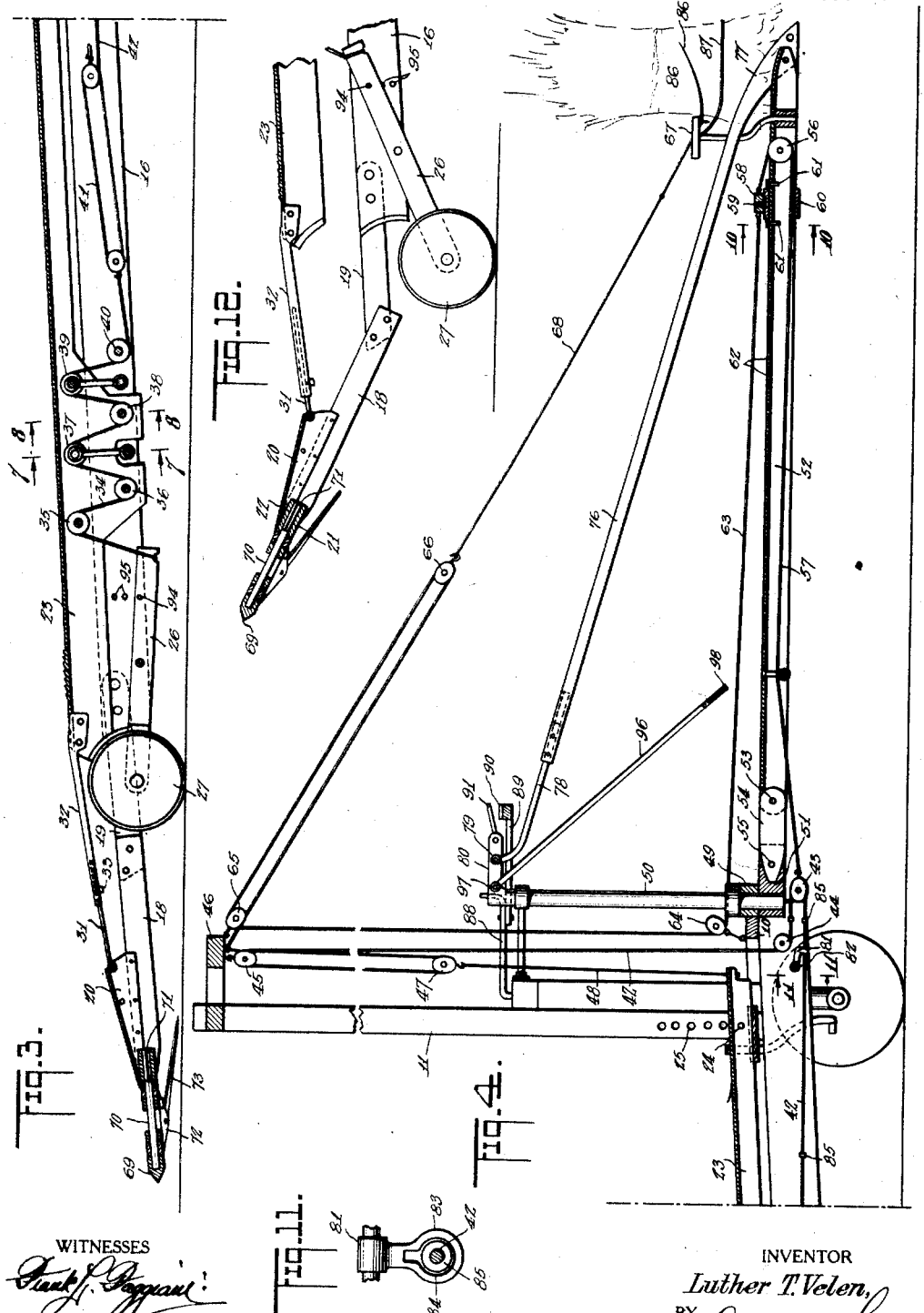
WITNESSES
INVENTOR
Luther T. Velen,
BY
ATTORNEYS Feb. 12, 1929.
L. T. VELEN
1,702,141
SHOCK LOADER AND CONVEYER
Filed Aug. 6, 1925 3 Sheets-Sheet 3
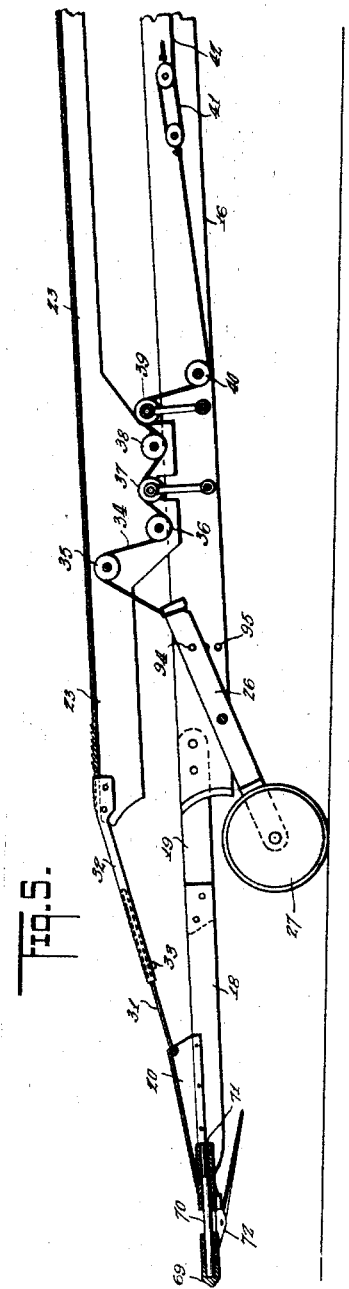
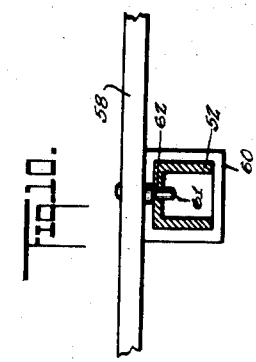
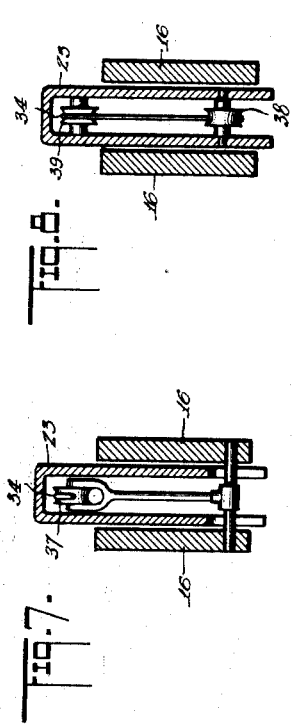
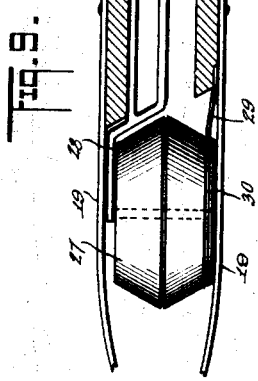
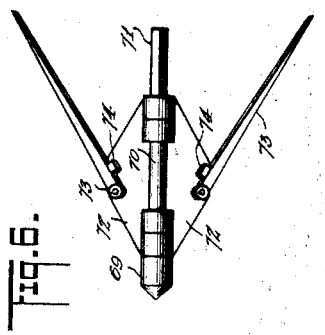
WITNESSES
INVENTOR
Luther T. Velen
BY
ATTORNEYS Patented Feb. 12, 1929.

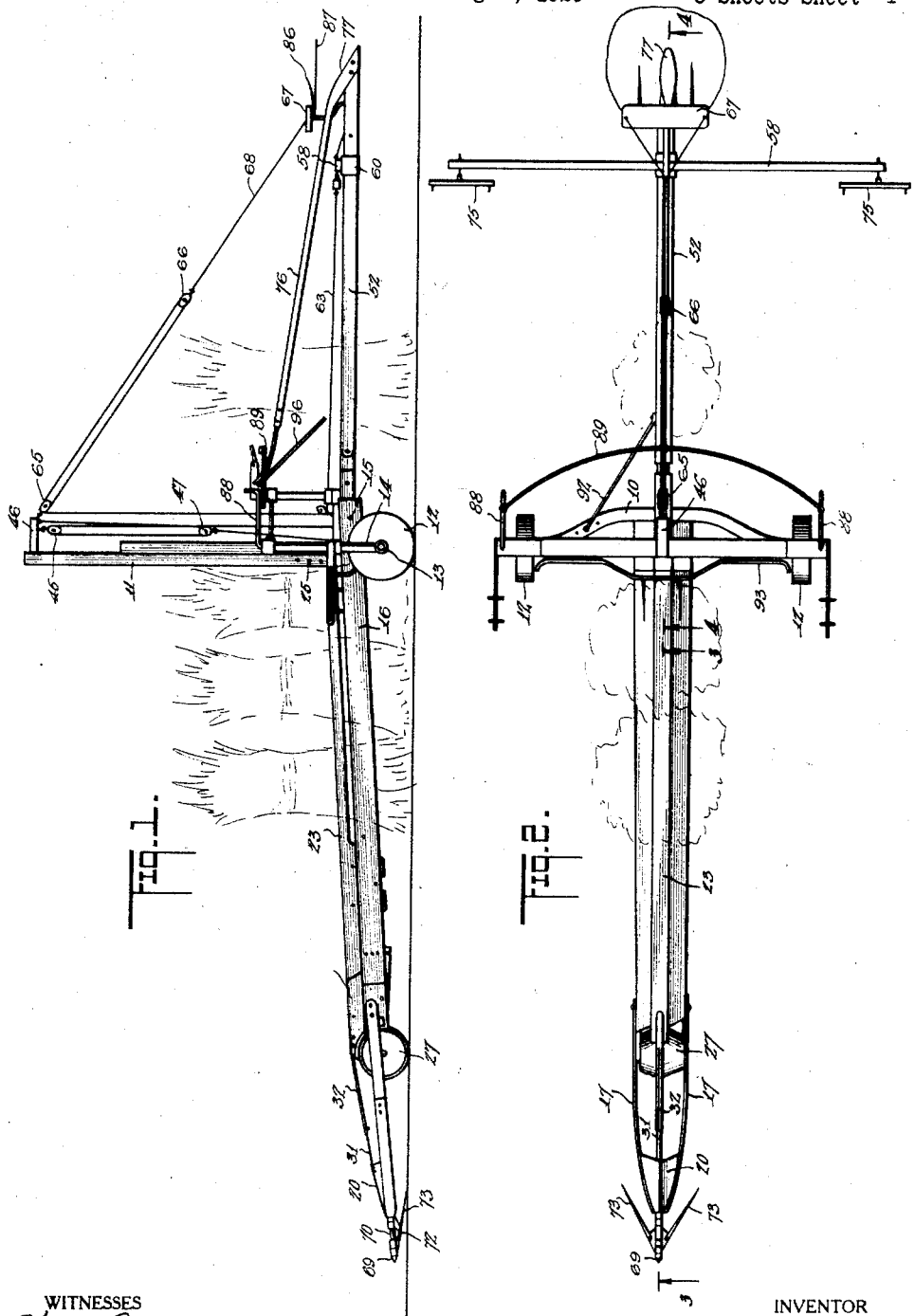

1,702,141

UNITED STATES PATENT OFFICE.

LUTHER T. VELEN, OF LANCASTER, PENNSYLVANIA.

SHOCK LOADER AND CONVEYER.

Application filed August 6, 1925. Serial No. 48,639.

This invention pertains to agricultural implements, and has particular reference to a loading and conveying implement or machine which is especially designed for the loading and transportation of shocks of corn or other grain.

Primarily the invention comprehends an implement or machine for piercing a succession of shocks, subsequently elevating the same to a position whereby they are out of contact with the ground, and then conveying or transporting the loaded shocks to their destination.

The invention furthermore contemplates means carried by the nose of the machine for cutting the uncut stalks or loosening the frozen stalks slightly in advance of the piercing of the shocks, which means specifically consists of horizontally and vertically pivoted knife blades which are automatically removed by backing or movement of the machine in a reverse direction after the final loading operation.

The invention further aims to provide an improved shock loading and conveying machine provided with a nose at the forward end thereof, which is capable of being elevated or raised to a position for supporting one or more shocks, thereby to increase the carrying capacity of the machine.

The invention furthermore contemplates in an animal-drawn machine, mechanism by means of which the animals may be employed to exert the necessary power for elevating the shocks when loaded upon the machine.

As a still further object the invention embodies a novel type of steering mechanism by means of which the machine may be steered manually or by the draft animals.

The invention has for a still further object a coupling device, by means of which a number of machines may be coupled in gang formation to permit of the transportation of a plurality of machines by a single team of draft animals or by tractor to and from their destination.

The invention furthermore contemplates a machine or implement of the character set forth, which is comparatively simple in its construction and mode of operation, which is inexpensive to manufacture and which is highly efficient in its purpose.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a side view of the machine illustrating the position of the parts during the loading operation;

Fig. 2 is a plan view thereof;

Fig. 3 is a fragmentary longitudinal sectional view through the forward end of the machine taken approximately on the line 3—3 of Fig. 2;

Fig. 4 is a similar view of the rear end of the machine taken approximately on the line indicated at 4—4 in Fig. 2;

Fig. 5 is a view similar to Fig. 3, illustrating the shock-supporting beam and frame in elevated position;

Fig. 6 is a detail plan view of the removable shock-cutting element carried by the nose of the machine;

Fig. 7 is a detail transverse sectional view taken approximately on the line 7—7 of Fig. 3;

Fig. 8 is a similar view taken approximately on the line 8—8 of Fig. 3;

Fig. 9 is a fragmentary sectional plan view of the front wheel of the machine and the supporting means therefor;

Fig. 10 is a transverse sectional view through the tongue of the machine, taken approximately on the line 10—10 of Fig. 4;

Fig. 11 is a detail sectional view illustrating the cable-locking element, the same being taken approximately on the line 11—11 of Fig. 4;

Fig. 12 is a view similar to Fig. 4, illustrating the nose adjusted to a raised position.

Referring to the drawings by characters of reference, the machine includes a cross frame member 10 which supports a vertical standard consisting of parallel members 11, and which elements are supported by dirigible supporting wheels 12. The wheels 12 are mounted on the inwardly-extending spindles 13 of rotary shanks 14 extending vertically through and having bearing in the outer ends of the cross frame member 10. The frame member 10 has pivoted thereto at 15, the parallel side rails 16 which constitute the forwardly projecting arm of the machine, which arm has secured to and projecting from its opposite side laterally spaced straps 17, each consisting of hingedly connected sections 18 and 19, the foremost sections 18 being in turn connected by a hood plate 20 which supports at its under side, a bearing member 21 having a longitudinally squared bore 22. A shock supporting beam 23 of substantially inverted U-shaped configuration in cross section, is adjustably supported by a pin 24 at its rear end between the parallel members of the standard, by inserting said pin through one pair of a series of alined bearing openings 25 in the standard members. At its forward end the arm has pivoted between its side rails 16, for vertical swinging movement, a lever 26, the forward end of which has journalled thereon, a supporting wheel 27 of substantially V-shaped peripheral configuration to allow the same to wedge its way through the shocks as the shock-supporting beam 23 pierces the same. The wheel 27 is supported from the offset portion 28 of the lever 26 from one side only, and in order to prevent the possible entry of trash between the wheel and the forward end of one of the side rails 16, a guard arm 29 is supported from said rail and engages in a peripheral groove 30 in the said side of the wheel. The beam 23 is connected at its forward end to the hood plate 20 by telescopically adjustable rod and tube sections 31 and 32, the latter having a retaining screw 33 for holding the sections in adjusted relation, and said rod, together with the hood member 20 and the strap sections 18 and 19 constitute what is termed the "nose" of the machine.

The lever 26 has connected to its rear end a cable 34, which is trained over the forward sheave 35 mounted on the beam 23, under the intermediate sheave 36 on the beam, over the forward sheave 37 on the arm, under the rear sheave 38 on the beam, over the intermediate sheave 39 on the arm, and under the lower rear sheave 40 on the arm. The rear end of the cable is connected to a block-and-tackle 41 from which the cable 42 leads rearwardly and is trained around the pulley of a block 43, thence around the guide sheave 44 on the rearmost end of the arm. From the guide sheave 44, the cable is trained over a block 45 supported by the rearwardly extending arm 46 at the upper end of the standard and thence around the fall 47. The fall 47 is in turn connected with the rear end of the beam 23 by a cable 48.

The main cross beam 10 is provided with a centrally disposed vertical bearing 49 in which a vertical rotary steering post 50 is mounted, the lower end of which has secured thereto a tongue socket 51. A channel-shaped tongue 52 is provided which is pivoted at one of its ends, as at 53, to a separate tongue section 54 designed, when inserted and secured in the socket 51 by a retaining pin 55, to attach the tongue to the steering post for vertical swinging movement. The main tongue section 52 adjacent its opposite end is provided with a sheave 56 around which is trained a cable 57, one extremity of which is attached to the block 43 and the opposite extremity of which is attached to a double-tree 58. The doubletree 58 is in turn pivoted or swiveled as at 59 to a sleeve-like base member 60 longitudinally slidable on the tongue and maintained in longitudinally adjusted positions by means of lock pins 61 which are engaged in a longitudinally spaced series of keeper openings 62 formed in the bight of the tongue. The doubletree is connected at its other side by a cable 63 trained around a guide pulley 64 on the main cross frame 10, with a block and fall 65 and 66, the block being attached to the arm 46 at the upper end of the standard 11. A seat 67 is removably mounted in the outermost end of the tongue 52 and a line 68 connects the fall 66 with the seat. A pointed head 69 having a circular shank 70 formed with a squared rear terminal 71, has pivoted thereto and projecting from the opposite sides, a pair of bearing plates 72, to which are in turn pivoted a pair of knives 73 engageable with stop lugs 74 on the plates for limiting the rearward swinging movement to dispose the knives in rearwardly diverging relation for cutting the standing stalks of a shock or loosening frozen stalks.

In loading the shocks S upon the beam 23, draft animals are hitched to the singletrees 75 attached to the opposite ends of the doubletree 58, with the doubletree secured in the position illustrated in Figs. 1, 2 and 4. A forward movement of the machine or implement with the nose in lowered position as illustrated in Figs. 1, 2 and 3, causes the pointed head and the nose to pierce the standing shocks, whereby the same are successively threaded upon the forwardly and downwardly inclined beam and nose until the beam is completely loaded. A final shock or two are received upon the nose after which the head carrying the knives 73 is removed either manually or by backing the machine a short distance while the nose is engaged in a standing shock. The telescopically adjustable sections 31 and 32 are then adjusted to a shortened relation after which the lock pins 61 are removed and the animals are driven in a forward direction to exert a pull on the cable 57, simultaneously exerting a pull on the block 43. The pin 24 which has been previously removed, permits a simultaneous upward pull on the rear end of the beam 23 through the medium of the cable 48 and the block and fall 45 and 47. At the same time, the movement of the block 43 exerts a pull on the cable 42, which through the block and tackle 41, exerts a pull on the cable 34 tending to effect a relative raising movement of the beam 23 with respect to the forwardly projecting arm. The pull on the cable 34 also swings the rear end of the lever 26 upwardly to elevate the arm and to effect the turning of the nose to an upward position, as illustrated in Fig. 12, to retain the final shock or shocks which are positioned thereon. This triple range raising action of the beam, the arm and the nose, causes the lower ends of the shocks to clear the ground so that when the machine is to be moved to transport the shocks to their destination the said lower ends of the shocks will be clear and free from engagement with the surface over which the machine is traveling.

In order to provide means for carrying additional shocks on the rear end of the machine, a beam or rod 76 having a downturned outer end 77, is detachably connected with the outermost end of the tongue 52, while the opposite end is telescopically connected with the connecting rod 78 pivoted for vertical movement at 79 to the rearwardly projecting arm 80 of the steering post. The shock-supporting beam or rod 76 is automatically lowered to dispose the downturned end in close proximity to the ground for picking up the shocks when the draft animals draw the sleeve-like base 60 and doubletree 58 forwardly, due to a slack in the cable 63 which permits the supporting line 68 connected respectively with the seat 67 and fall 66, to drop the outer end of the tongue. The singletrees 75 are then reversed on the doubletree and the animals pull the machine in the opposite direction to pierce the shocks and load the same upon the shock-supporting beam or rod 76.

In order to accomplish this, however, the sleeve-like base 60 of the doubletree is secured by the lock pins 61 in its forwardly adjusted position on the tongue 52. The beam 23 and the underlying arm are locked in their elevated position by reinserting the pin 24 and by bringing the latch 81 into play, which latch is pivoted as at 82 between the side rails 16 of the arm. The latch is formed with a nose 83 having a keyhole slot 84, and stop collars 85 are provided on the cable 42 at various points to coact and engage with the latch 81. After the shock-supporting rod or beam 76 is filled, a final shock is mounted on the tines 86 which project rearwardly from the seat 67 and a retaining loop 87 formed in the outer end of the line 68 is adapted to embrace and retain the final shock on the tines 86.

The machine is ordinarily steered manually by means of the crank arms 88 secured to the upper end of the rotary shanks 14, which crank arms are connected by an arcuate connecting rod 89 provided at its central portion with a rack toothed section 90. In some instances, however, where it is desired to steer the machine by effecting lateral movement of the tongue by the draft animals, a pawl 91 pivoted to the steering post arm 80 is engaged with the rack toothed section 90 of the arcuate connecting rod 89. In the other instance where it is steered manually, a brace rod 92 rigidly holds the tongue against lateral movement by connecting the same with the main cross frame 10 of the machine.

In order to provide means for shielding the shocks threaded on the supporting beam 23 from contacting or clogging the wheels 12, a guard 93 is employed.

To further assist in holding the beam 23 and the side rails 16 of the underlying arm in raised position, a pin 94 is inserted through an opening in the lever 26 and through alined openings 95 in the side rails 16.

Where it is desired to couple a plurality of machines in gang formation after loading, a coupling bar 96 is pivotally attached as at 97, to the arm 80 of the steering post, the opposite end 98 being provided with a squared terminal adapted for engagement and securement within the longitudinally squared bore 22 of the bearing member 21 of the nose of the next adjacent machine.

From the foregoing it will thus be seen that a shock loading and conveying machine or implement has been devised for facilitating the loading and transportation of shocks in an expeditious and economical manner.

It will furthermore be noted that the machine is constructed in such a manner as to handle a maximum number of shocks in proportion to the size of the machine. Under the construction and arrangement of the machine, it will be further observed that means is provided for loading wind-rowed shocks and for unloading the same. In unloading the shocks, it is obvious that the shock-supporting beams are lowered by reversing the operation.

What is claimed is:

1. A shock loader and conveyer, comprising a wheeled vehicle, including forwardly and rearwardly projecting elements for piercing a succession of shocks upon movement of the machine in opposite directions, and mechanism for elevating said elements to raise the lower ends of the shocks out of contact with the ground to facilitate transportation thereof.

2. A shock loader and conveyer, comprising a wheeled vehicle including a beam supported from the vehicle for piercing a succession of shocks, means for elevating the same to raise the lower end of the shocks out of contact with the ground to facilitate transportation thereof, and a nose pivoted at the free end of the beam and operatively connected therewith whereby upon elevation of the beam the nose is turned upwardly to support the outermost shock and prevent displacement thereof when in transit.

3. A shock loader and conveyer, comprising a wheeled vehicle including a beam supported from the vehicle for piercing a succession of shocks, and means for elevating the same to raise the lower ends of the shocks out of contact with the ground to facilitate transportation thereof, said vehicle including a supporting wheel for the outer end of the beam, having a V-shaped periphery whereby to facilitate the wedging or forcing of the wheel through the shocks when piercing the same.

4. A shock loader and conveyer, consisting of a wheeled vehicle, a forwardly projecting arm pivoted to the vehicle, a lever at the forward end of the arm having a supporting wheel journaled to the forward end of the lever, a relatively movable beam overlying the arm, and means connected with the lever and the beam for effecting relative vertical movements of the beam and arm with respect to each other and with respect to the ground by swinging said lever from a normally horizontal position to an inclined position.

5. A shock loader and conveyer, consisting of a wheeled vehicle, a forwardly projecting arm pivoted to the vehicle, a lever at the forward end of the arm having a supporting wheel journaled to the forward end of the lever, a relatively movable beam overlying the arm, means connected with the lever and the beam for effecting relative vertical movements of the beam and arm with respect to each other and with respect to the ground by swinging said lever from a normally horizontal position to an inclined position, and a nose supported by the forward end of the beam and arm and adjustable to a turned-up position when the beam and arm are elevated.

6. A shock loader and conveyer, consisting of a wheeled vehicle, a forwardly projecting arm pivoted to the vehicle, a lever at the forward end of the arm having a supporting wheel journaled to the forward end of the lever, a relatively movable beam overlying the arm, means connected with the lever and the beam for effecting relative vertical movements of the beam and arm with respect to each other and with respect to the ground by swinging said lever from a normally horizontal position to an inclined position, and a nose supported by the forward end of the beam and arm and adjustable to a turned-up position when the beam and arm are elevated, the said beam and arm-elevating means consisting of a cable, sheaves journalled respectively on the beam and arm over which the cable is trained and means connected with the rear end of the cable for exerting an outward pull thereon to effect the elevation of the beam and arm.

7. A shock loader and conveyer, consisting of a wheeled vehicle, a forwardly projecting arm pivoted to the vehicle, a lever at the forward end of the arm having a supporting wheel journaled to the forward end of the lever, a relatively movable beam overlying the arm, means connected with the lever and the beam for effecting relative vertical movements of the beam and arm with respect to each other and with respect to the ground by swinging said lever from a normally horizontal position to an inclined position, and a nose supported by the forward end of the beam and arm and adjustable to a turned-up position when the beam and arm are elevated, the said beam and arm-elevating means consisting of a cable, sheaves journaled respectively on the beam and arm over which the cable is trained and means connected with the rear end of the cable for exerting a rearward pull thereon to effect the elevation of the beam and arm, said latter means consisting of a block and tackle connected respectively with the cable and with the rear end of the beam.

8. A shock loader and conveyer, consisting of a wheeled vehicle, a forwardly projecting arm pivoted to the vehicle, a lever at the forward end of the arm having a supporting wheel journaled to the forward end of the lever, a relatively movable beam overlying the arm, means connected with the lever and the beam for effecting relative vertical movements of the beam and arm with respect to each other and with respect to the ground by swinging said lever from a normally horizontal position to an inclined position, a nose supported by the forward end of the beam and arm and adjustable to a turned-up position when the beam and arm are elevated, the said beam and arm-elevating means consisting of a cable, sheaves journaled respectively on the beam and arm over which the cable is trained and means connected with the rear end of the cable for exerting a rearward pull thereon to effect the elevation of the beam and arm, said latter means consisting of a block and tackle connected respectively with the cable and with the rear end of the beam, a tongue projecting rearwardly from the vehicle having draft animal hitching means longitudinally movable thereon, and a connection between said hitching means and the block whereby forward movement of said hitching means with respect to the tongue exerts a pull on the block to effect the elevation of the beam and arm.

9. A shock loader and conveyer, comprising a wheeled vehicle including a main cross frame having dirigible wheels thereon, a rearwardly projecting tongue having draft animal hitching means thereon, a forwardly projecting arm, a beam overlying said arm, means connected with and operable by relative movement of the animal hitching means on the tongue for elevating and supporting the beam and arm, and a downwardly directed nose carried by the forward end of the arm and beam for piercing and guiding a succession of shocks upon the beam upon forward movement of the machine.

10. A shock loader and conveyer, comprising a wheeled vehicle including a main cross frame having dirigible wheels thereon, a rearwardly projecting tongue having draft animal hitching means thereon, a forwardly projecting arm, a beam overlying said arm, means connected with and operable by relative movement of the animal hitching means on the tongue for elevating and supporting the beam and arm, a downwardly directed nose carried by the forward end of the arm and beam for piercing and guiding a succession of shocks upon the beam upon forward movement of the machine, and means connected with and supported by the tongue and operable by resilient movement of the machine for piercing a succession of shocks, in combination with mechanism operable by the animal hitching means in a rearward direction for raising said shock supporting means for elevating the shocks.

11. In a machine for loading and moving shocks, a beam arranged to pierce and support a standing shock and a pair of horizontally swinging arms located near the front end of said beam adapted to cut or loosen stalks frozen to the ground and to yield forwardly when the movement of the machine is reversed to unload the shock.

12. In a shock loader and conveyer, a beam adapted to pierce and support standing shocks, means for raising said beam and a shock holding arm connected near the forward end of said beam arranged to project upwardly or laterally from said beam as the beam is raised.

13. In a shock loader and conveyer, a beam arranged to pierce and support standing shocks, and a pair of horizontally swingable arms arranged near the front end of said beam and adapted to cut or loosen stalks frozen to the ground.

14. In a shock loader and conveyer, a beam adapted to support shocks of corn, an arm pivoted to the forward end of said beam arranged to pierce a standing shock and means for tilting said arm upward in relation to said beam.

15. In a shock loader and conveyer, a beam arranged to pierce and support standing shocks, steering wheels arranged near the rear end of said beam, hand steering apparatus connected to said wheels, a horizontally swinging pole located behind said wheels and means for clutching said steering apparatus to said pole.

16. In a shock loader and conveyer, a beam arranged to pierce and support standing shocks, steering wheels arranged near the rear end of said beam, hand steering apparatus connected to said wheels, a horizontally swinging pole located behind said wheels and means for clutching said steering apparatus to said pole, and means for locking the swinging movement of said pole.

17. In a shock loader and conveyer, a main frame, a ground wheel supporting the front end of said frame, a lever for raising said frame mounted in said wheel, a sheave located above said lever and supported on said frame, a shock supporting beam located above said frame and a pulley carried by said beam located below said sheave.

18. In a shock loader and conveyer, a main frame, a ground wheel supporting the front end of said frame, a lever for raising said frame mounted in said wheel, a sheave located above said lever and supported on said frame, a shock supporting beam located above said frame and a pulley carried by said beam located below said sheave, and a cable connected to said lever adapted to travel over said sheave and under said pulley.

19. In a shock loader and conveyer, a main frame, a carrying wheel mounted near the front end of said frame, a shock supporting beam located behind said wheel, arms adapted to pierce a standing shock located one on each side of said wheel and means for raising said guides to prevent the wheel from clogging.

20. In a shock loader and conveyer, a main frame, a carrying wheel having a V-shaped tread located near the front end of said frame, a groove in the periphery of said wheel and a shock supporting beam located in rear of said wheel and having its front end adapted to travel in said groove.

21. In a shock loading and conveying machine, a shock piercing and supporting beam, a front carrying wheel, steering wheels located near the rear end of said beam and means for pushing and pulling said machine from the rear.

22. In a shock loading and conveying apparatus, a shock supporting beam, a carrying wheel for the front end of said beam, shock piercing guides located forward of said wheel, means for shifting the rear end of said beam laterally and means for pushing and pulling said apparatus from the rear.

23. In a shock loading and conveying apparatus, a shock piercing and supporting beam, a carrying wheel for the front end of said beam, a lever for raising said beam mounted in said wheel, means for shifting the rear end of said apparatus laterally, means for operating said lever to raise the beam and means for pushing and pulling said apparatus.

24. In a shock loader and conveyer, a shock piercing and supporting beam, a front carrying wheel, a pair of rear carrying wheels spaced to permit a shock of corn to pass between same and an axle for said rear wheels arched rearwardly to permit butts of stalks to pass behind the axis of said rear wheels.

25. In a shock loader and conveyer, a shock piercing and supporting beam, a main frame, a pulley mounted near the lower edge and front end of said beam and a cable connected above said pulley to a member supported by said frame and adapted to travel under said pulley for the purpose of raising said beam.

26. In a shock loader and conveyer, a main frame, a shock piercing and supporting member, a shaft mounted near the forward end of said frame, an arm projecting forwardly from said shaft, a carrying wheel mounted near the front end of said arm, an arm projecting rearwardly from said shaft, a pulley supported above said shaft and a cable connected to the free end of said rearwardly projecting arm and adapted to travel over said pulley for the purpose of raising said member.

27. In a shock loading and conveying machine, a main frame, a beam adapted to pierce and support standing shocks, apparatus for raising said frame and beam independently, a pole for steering said machine, a slidable draft member mounted on said pole and a cable connecting the draft member with said apparatus whereby a pull on the cable will raise the beam from the frame and lift the frame.

28. In a shock loader and conveyer, a pair of beams adapted to pierce and support standing shocks, an arm having obstructions near its upper edge to prevent shocks from sliding off arranged between said beam, means for elevating said arm to raise the shocks and means for lowering said arm to unload the shocks.

29. In a shock loader and conveyer, a main frame, means for supporting shocks of corn, shaft attaching means connected to said frame, a shaft having means at its opposite ends adapted for selective connection with said attaching means and a draft member carried by said shaft.

30. In a shock loader and mover, a main frame, a transverse frame located near the rear end of said main frame, steering spindles mounted near the ends of said transverse frame, steering wheels mounted inside of said spindles, a shock supporting beam located between said wheels, and means for turning said spindles.

31. In a shock loader and conveyer, a shock supporting beam, a spindle located at each side and near the rear end of said beam, a wheel on each spindle, a vertical shaft supported between and in rear of said spindles and a one piece steering beam arranged to mutually transmit rotary motion to said spindles and shaft.

32. In a shock loading and conveying machine, a main frame, a vertically adjustable beam adapted to support the shocks, a shock piercing arm connected to said frame located forward of said beam, and guide connection arranged to direct the stalks of corn from said arm to said beam.

33. In a shock loading and conveying apparatus, a main frame, a vertically adjustable shock supporting beam, a shock piercing arm connected to said frame located forward of said beam, and slidable connection for directing stalks of corn from said arm to said beam.

34. In a shock loading and conveying apparatus, a shock piercing and supporting beam, a carrying wheel for the front ends of said beam, means for raising said beam, means for steering said apparatus, and means for pushing said apparatus from the rear.

35. In a shock loading and conveying machine, a main frame, a front carrying wheel, a shock supporting beam, means for raising the front end of said frame, means for steering said machine, and means for pushing said machine from the rear.

36. In a shock loading and conveying machine, a main frame, a shock piercing and supporting beam, means for vertically adjusting the rear end of said beam, means for raising the front end of said beam, means for steering said machine, and means for pushing said machine.

37. In a shock loader and conveyer, a main frame, a carrying wheel located near the front end of said frame, a groove in the periphery of said wheel, and a shock supporting beam located in the rear of said wheel and having a member adapted to enter said groove.

38. In a shock loading and conveying machine, a main frame, a beam adapted to support standing shocks, an arm for pushing said machine, a slidable member mounted on said arm, and means for raising said beam through the movement of said member.

39. In a shock loader and conveyer, a shock supporting beam, a wheel located at each side near the rear end of said beam, spindles for steering said wheels, a shaft located between and in rear of said spindles, a steering arm connected to said shaft, and means for transmitting mutual rotary motion to said shaft and spindles.

40. In a shock loading and conveying machine, a main frame, a beam adapted to support standing shocks, an arm for pushing said machine, a sliding member mounted on said arm, and means for raising said frame through the movement of said member.

41. In a shock loader and conveyer, a main frame, a beam adapted to support shocks of corn, an arm pivoted to the forward end of said frame arranged to pierce standing shocks, and means for effecting mutual vertical movement of said arm and beam.

42. In a shock loading and conveying apparatus, a shock piercing and supporting beam, means for vertically adjusting the rear end of said beam, means for elevating the front end of said beam, means for propelling said apparatus for the purpose of stringing shocks on said beam, and means for reversing the movement of said apparatus for the purpose of unloading the shocks.

43. In a shock loading and conveying apparatus, a shock piercing and supporting beam, a carrying wheel for supporting the front end of said beam arranged to pass through a standing shock of corn, means for pushing said apparatus for the purpose of stringing shocks on said beam, and means for reversing the movement of said apparatus for the purpose of unloading the shocks.

44. In a shock loading and conveying apparatus, a shock supporting beam, means for supporting the front end of said beam, means for supporting the rear end of said beam, means for propelling said apparatus for the purpose of stringing shocks on said beam, and means for reversing the movement of said apparatus for the purpose of unloading the shocks.

LUTHER T. VELEN.